Dec. 10, 1929. D. E. WASHINGTON, 2D 1,738,621
AUTOMATIC SAFETY VALVE FOR PNEUMATIC TIRES
Filed April 25, 1927
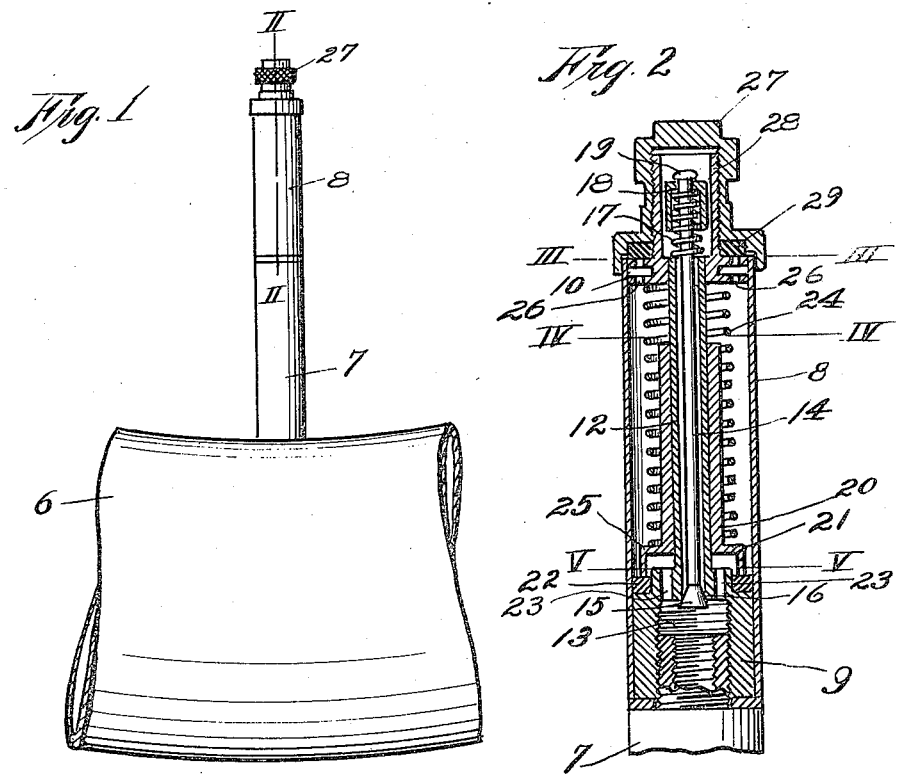
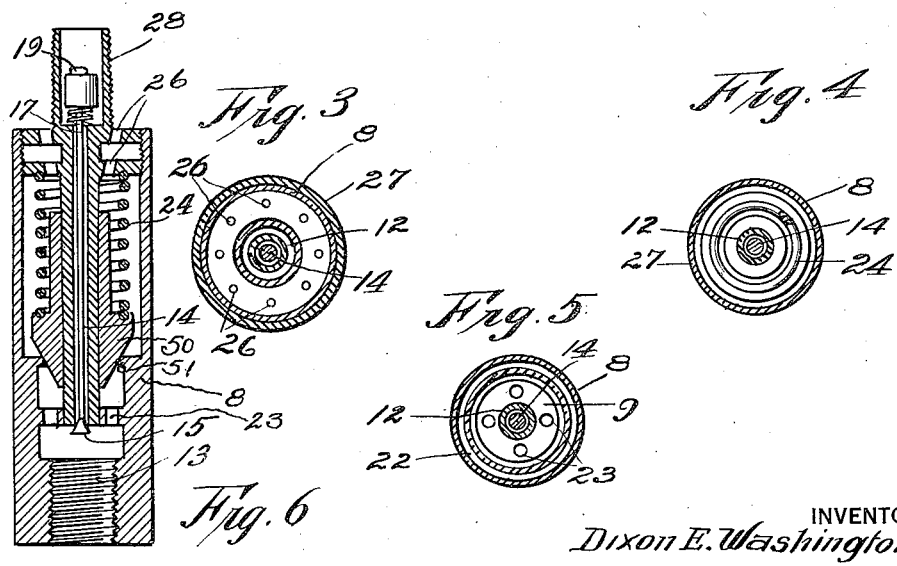
INVENTOR
Dixon E. Washington II
ATTORNEY Patented Dec. 10, 1929

1,738,621

UNITED STATES PATENT OFFICE

DIXON E. WASHINGTON, 2D, OF KANSAS CITY, MISSOURI

AUTOMATIC SAFETY VALVE FOR PNEUMATIC TIRES

Application filed April 25, 1927. Serial No. 186,239.

This invention relates to charging valves for pneumatic tires or the like, and has for its primary object the provision of means for permitting only a predetermined pressure to be built up in the tire.

Another object of this invention is the provision of a device having co-operating valves whereby the filling of the chamber with which it is used is done thru one of the said valves while the other said valve permits of the release of air in excess of the predetermined pressure.

A further object of this invention is to provide a safety valve which is provided with an audible signaling device which is operated by the exhausting air from the pneumatic tire.

A still further object of this invention is the provision of a safety valve which is easily affixed to the valve stem now in general use.

Many minor objects of the invention will appear during the course of the detailed specification referring to the accompanying drawing, in which Figure 1, is a side elevation of the safety valve showing the same used in conjunction with an ordinary pneumatic tire and valve stem.

Fig. 2, is a vertical central section on line II—II of Fig. 1.

Fig. 3, is a cross-section on line III—III of Fig. 2.

Fig. 4, is a similar cross-section on line IV—IV of Fig. 2.

Fig. 5, is a similar cross-section taken on line V—V of Fig. 2, and

Fig. 6 is a vertical central section of a modified form of the valve.

Similar reference characters refer to like parts thruout the several views, and the numeral 6 designates a fragment of pneumatic tire, which is equipped with the ordinary valve stem 7, to which may be attached the device made in accordance with this invention. Referring now to Fig. 2, which shows the general embodiment of this invention, 8 designates a housing having plugs 9 and 10 at each end respectively thereof. The plug 9 having an integral inner tubular extension 12, extending axially and longitudinally of the housing 8 to join opposite plug 10. Plug 9, as shown in Fig. 2, has a tapped cavity 13 extending inwardly from the outer end, which serves as a means for affixing the device to the ordinary valve stem 7.

In the use of this safety valve, the valve core ordinarily used in the well known valve stem 7 is removed and a structure performing a similar function is provided in the attachable safety valve. The above mentioned tubular portion 12 communicates with cavity 13 of the plug 9 and carries a valve stem 14, which extends therethru and is provided at one end with a valve 15 which seats on valve seat 16 formed by the annular inner edge of the tube 12. Stem 14 extends thru and above plug 10 to be engaged by a tension spring 17 which serves to hold valve 15 in closed relation to valve seat 16. As clearly shown in Fig. 2, this tension spring 17 is held in position around the upper end of valve stem 14 by means of a cup washer 18, which in turn is held in position by head 19 formed on the upper end of valve stem 14.

To properly perform the function desired of this invention, it is necessary to provide a co-operating auxiliary valve which releases the air pressure when a predetermined pressure is reached. Accordingly, the preferred embodiment of this invention may provide an auxiliary valve 20, which is slidably mounted on tube 12. The lower portion of auxiliary valve 20 has a depending annular flange 21, which normally seats on valve seat 22. Valve seat 22 is located in an annular notch formed by plug 9, thus permitting the upper end of plug 9 to extend within the confines of the annular depending flange 21 when the auxiliary valve 20 is in the seated position. Plug 9 is provided with a plurality of openings 23 which extend thru the upper end thereof to join cavity 13, and the space formed within the annular wall of the auxiliary valve 20 when in the closed position. This construction permits of a greater operating surface for the air pressure thus rendering a more accurate operation of the safety valve.

Due to the fact that it is necessary to provide valves to operate under varying predetermined pressures, it is necessary to provide means within each safety valve which will respond to varying given pressures. In the instance shown, this means is shown to be a tension spring 24, which encircles a portion of the auxiliary valve 20 and the tube 12, and one end of the spring 24 bears against a shoulder 25 formed at one end of auxiliary valve 20, while the other end bears against the under side of plug 10. As shown in Fig. 2, the auxiliary valve 20 extends upwardly along tube 12 to form a substantial guide. The sliding fit between the inner surface of this portion of auxiliary valve 20 and tube 12 is such that a perfect seal is maintained at all times, and no air escapes upwardly between the two.

When the charging air passing into the tire 6 thru tube 12, cavity 13 and stem 7 rises above a predetermined pressure, air passes thru the openings 12 in plug 9 and exerts a pressure against auxiliary valve 20, thus compressing spring 24 and lifting the auxiliary valve 20 from its seat 22, and permitting air to pass into the housing 8 and thence thru a plurality of perforations 26 which are formed thru plug 10. When this operation takes place, the cap 27 has been removed and the constant escape of air thru perforations 26 will emit an audible signal which is the result of the construction and size of the perforations 26. Plug 10 is formed with an outwardly extending externally threaded tubular projection 28 which houses the upper end of stem 14 and spring 17, and cup washer 18. Cap 27 which is provided with a gasket 29 is internally threaded to fit the threaded portion of plug 10 to seal the perforations 26 in plug 10, and also seals the upper end of projection 28.

The modified form of construction shown in Fig. 6 does not differ in the basic principle, but merely illustrates a different way of constructing a valve in accordance with this invention. Practically all the parts are like those shown in Figs. 1 to 5 inclusive, with the exception of the auxiliary valve structure. In this instance, the auxiliary valve has a tapered head 50 integral with the sleeve portion, which rests upon the annular edge 51 of the valve seat when in the closed position. A chamber is formed below the auxiliary valve and around the charging valve, the same as in the preferred form of the invention.

The operation of this novel safety valve has been made clear thruout the specification, and while the preferred form is illustrated and described, it is to be understood that many modifications may be made and a great variance in the selection of materials practiced without departing from the scope of the appended claims and the spirit of the invention in general.

Having thus described the invention, what is claimed as new and desired to be secured by Letters Patent is:

1. In a safety valve, a housing, upper and lower partitions in said housing, a tubular member connecting said partitions, said lower partition having inlet and outlet air passages therein, valves for closing said passages, said upper partition having air outlet ports therein and adapted to vent the air passed through the outlet passage in the lower partition.

2. In a safety valve as set forth in claim 1, wherein the upper partition is provided with an upwardly extending tubular portion, said portion having threads on its outer periphery, a cap for engaging said threads, said cap being provided with means for closing the air outlet ports in said upper partition.

In testimony whereof, I hereunto affix my signature.

DIXON E. WASHINGTON, II.